United States Patent [19]

Hager et al.

[11] Patent Number: 5,198,301

[45] Date of Patent: Mar. 30, 1993

[54] FLEXIBLE AND CONFORMABLE IONOMERIC RESIN BASED FILMS

[75] Inventors: Patrick J. Hager, Woodbury; Del A. Kauss, Maplewood; Janet T. Keller, Eagan, all of Minn.

[73] Assignee: Minnesota Mining and Manufacturing Company, St. Paul, Minn.

[21] Appl. No.: 702,065

[22] Filed: May 17, 1991

[51] Int. Cl.$^5$ .................. C08L 33/02; B32B 5/16; B32B 7/12

[52] U.S. Cl. .................. 428/355; 428/323; 428/327; 428/328; 428/343; 525/221; 525/196; 524/522

[58] Field of Search .......... 428/323, 325, 327, 328, 428/343, 355; 525/221, 196, 187; 524/522

[56] References Cited

U.S. PATENT DOCUMENTS

| | | | |
|---|---|---|---|
| 3,445,546 | 5/1969 | Pledger, Jr. ................. | 525/222 X |
| 3,691,140 | 9/1972 | Silver ........................ | 260/78.5 |
| 3,857,731 | 12/1974 | Merrill, Jr. et al. .......... | 117/122 |
| 3,869,422 | 3/1975 | Dawes et al. ................ | 525/221 X |
| 3,937,854 | 2/1976 | Shank, Jr. ................... | 427/29 |
| 4,161,562 | 7/1979 | Yoshikawa et al. ........... | 428/215 |
| 4,279,344 | 7/1981 | Holloway, Jr. ............... | 206/631 |
| 4,481,254 | 11/1984 | Fukushima et al. ........... | 428/330 X |
| 4,550,141 | 10/1985 | Hoh ........................... | 525/221 |
| 4,567,219 | 1/1986 | Tominaga et al. ............ | 525/196 X |
| 4,615,941 | 10/1986 | Lu ............................. | 428/327 |
| 4,653,752 | 3/1987 | Miller ........................ | 156/73.5 X |
| 4,735,837 | 4/1988 | Miyasaka et al. ............ | 428/40 |
| 4,805,327 | 2/1989 | Buckley ..................... | 40/159 |
| 4,807,922 | 2/1989 | Glover ....................... | 296/136 |
| 4,835,025 | 5/1989 | Thompson et al. .......... | 428/34.2 |
| 4,884,814 | 12/1989 | Sullivan ..................... | 525/221 X |
| 4,897,136 | 1/1990 | Bailey et al. ................ | 428/325 X |
| 4,900,604 | 2/1990 | Martinez et al. ............ | 428/79 |
| 4,911,451 | 3/1990 | Sullivan et al. ............. | 525/221 X |
| 4,916,025 | 4/1990 | Lu ............................. | 428/516 |
| 4,983,436 | 1/1991 | Bailey et al. ................ | 428/325 X |
| 4,984,804 | 1/1991 | Yamada et al. .............. | 525/196 X |
| 4,994,322 | 2/1991 | Delgado et al. ............. | 428/355 X |
| 5,068,151 | 11/1991 | Nakamura et al. .......... | 525/221 X |
| 5,120,791 | 6/1992 | Sullivan ..................... | 525/221 X |

FOREIGN PATENT DOCUMENTS 371635 8/1989 European Pat. Off. .

OTHER PUBLICATIONS

Surlyn, T. M., "Ionomer Resin", pp. 1-31.
Surlyn, "Industrial Extrusions Manual", pp. 1-24.
Surlyn® Property Grid, Product Literature #E-90154.

*Primary Examiner*—George F. Lesmes
*Assistant Examiner*—D. R. Zirker
*Attorney, Agent, or Firm*—Gary L. Griswold; Walter N. Kirn; Dale A. Bjorkman

[57] ABSTRACT

Films are provided made from ionomeric polymer resins with 2-40% by weight of a filler material, where the film has a thickness between 0.050 and 0.127 mm. These films are highly flexible and conformable. Adhesive composites comprising these films are also provided.

22 Claims, 2 Drawing Sheets

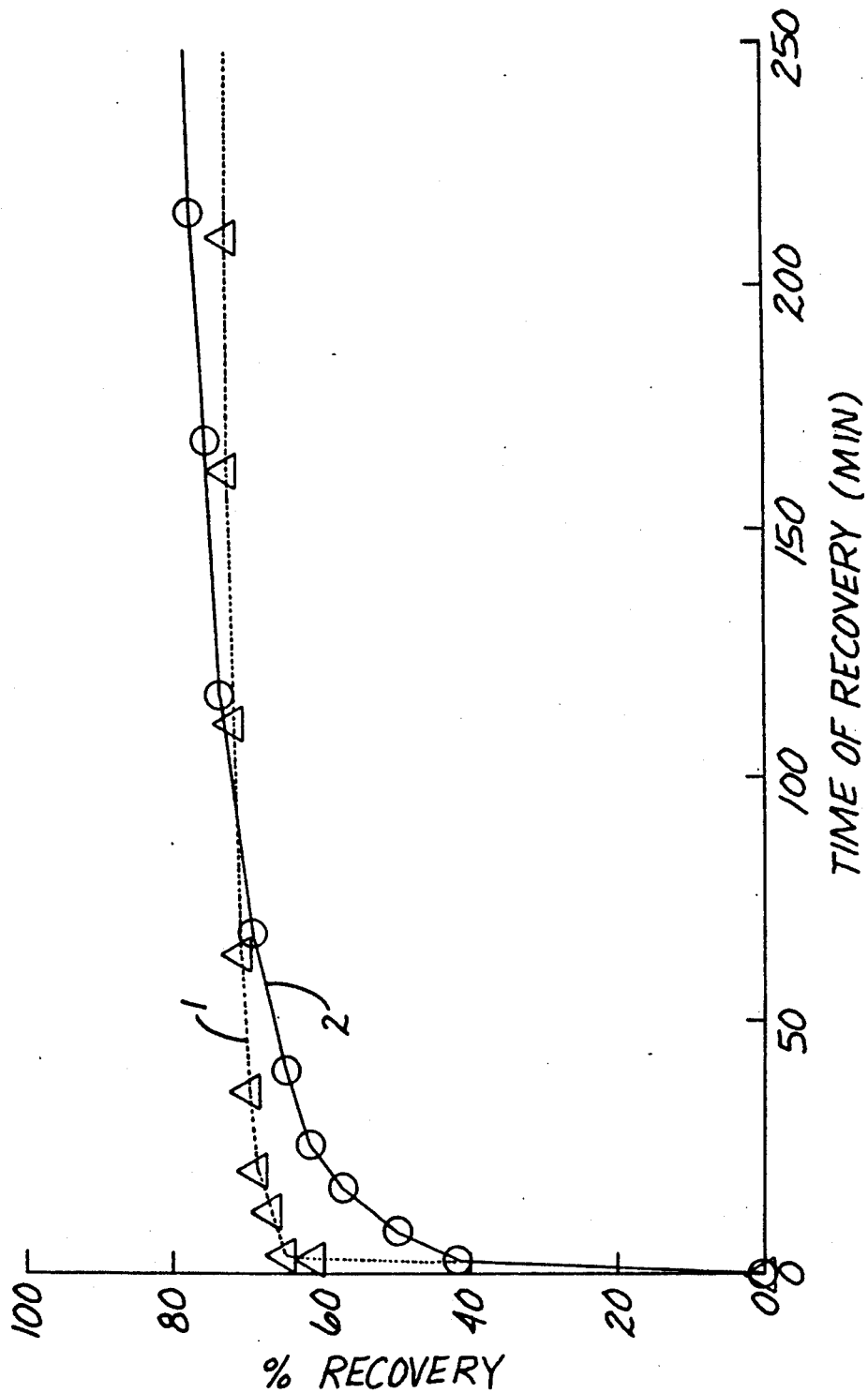

FLEXIBLE AND CONFORMABLE IONOMERIC RESIN BASED FILMS

FIELD OF THE INVENTION

This invention relates to films made from modified ionomeric resins. More particularly, this invention relates to flexible and conformable films made from modified ionomeric resins.

BACKGROUND

Polyvinyl chloride (PVC) film has been used in film form for numerous applications, such as adhesive tapes, automotive pinstripes, dust covers and the like. A specific application of PVC film is in decorative borders and appliques as described in U.S. Pat. No. 4,900,604 to Martinez et al. PVC resin has to be highly plasticized to give it flexibility for these uses. The PVC is processed by premixing in plasticizers and stabilizers, then sheeting out the film in a calendering operation. When the film is laminated onto a liner, the film is held in a stretched conformation that is only released when the film is removed from the liner. In later use, the film may additionally be stretched during application. After time passes, the film "remembers" its relaxed state and shrinks. This is especially a problem in adhesive composite structures, such as adhesive tape or decorative borders or appliques. In such applications, the shrinking of the film causes a shear stress in the adhesive layer. When this happens, the product may fall off the substrate.

Ionomeric resins (such as the Surlyn TM family of resins, commercially available from E. I. DuPont de Nemours Co.) have been mainly exploited as a tough covering for sporting equipment such as golf balls, and as a heat-shrinkable plastic wrap component. In some cases, the cold temperature properties of ionomers have proved useful, as in U.S. Pat. No. 4,161,562. Ethylene-co-methacrylic acid copolymers have been blended, as in U.S. Pat. Nos. 3,445,546 and 3,869,422, and more recently U.S. Pat. No. 4,916,025. In the latter patent, Surlyn TM material was used only as a heat sealing outer layer, optionally blended with other resins to reduce cost. Given the recommended uses for Surlyn TM resins, one would not expect the filled material to act as a stand-alone conformable film.

U.S. Pat. No. 4,279,344 describes a peelable, heat-sealable packaging laminate. The inner sealing layer is formed from polypropylene or polyethylene/polypropylene copolymer blended with 15-35% Surlyn TM ionomer. The heat-sealed Surlyn TM film bonds are described as hand peelable. U.S. Pat. No. 4,835,025 describes a barrier laminate for essential oils/flavorings composed of paper substrate coated with nylon, which is coated with Surlyn TM resin and a coating of olefin (polyethylene) overall. The intermediate nylon or Surlyn TM film layer may be pigmented using a pigment such as $TiO_2$ at 0.5-15%.

U.S. Pat. No. 4,653,752 describes a sport ball comprised of a plastic shell covered with a sewn cover. The shell is a blend of Surlyn TM resin with 25-50% ethylene-co-vinyl acetate (EVA). The Surlyn TM resin is described as providing strength and durability, while the EVA provides softness. These properties are noted for bulk-like materials such as spherical balls. Increasing EVA content leads to more rubbery, softer materials, while increasing Surlyn TM resin levels leads to harder, more resilient materials. Regarding additives, small amounts of other plastic polymers may be added without changing the characteristics significantly, and glass may be added as well.

SUMMARY OF THE INVENTION

We have found that ionomeric polymer resins having a melt flow index of greater than 10 are flexible and conform to irregular surfaces when produced in film form having a thickness of between about 0.050 and 0.127 mm, when the ionomeric polymer resin is mixed with a filler that is not an ionomeric polymer. The films of this invention further exhibit superior long-term stability (both thermal and dimensional) in use. A preferred application of these films is for adhesive composites, such as adhesive tapes or wall decorating substrate films. Adhesive composites tend to graphically illustrate the superior nature of the present films in long-term dimensional stability, because the present films tend to remain in place once applied to uneven or textured surfaces such as painted walls. In addition, the films of this invention contain no migrating plasticizers or other leachable additives.

BRIEF DESCRIPTION OF THE DRAWING

FIG. 2 is a closer view of the initial portion of the recovery curve shown in FIG. 1.

DETAILED DESCRIPTION OF PRESENTLY PREFERRED EMBODIMENTS

Figure 1:
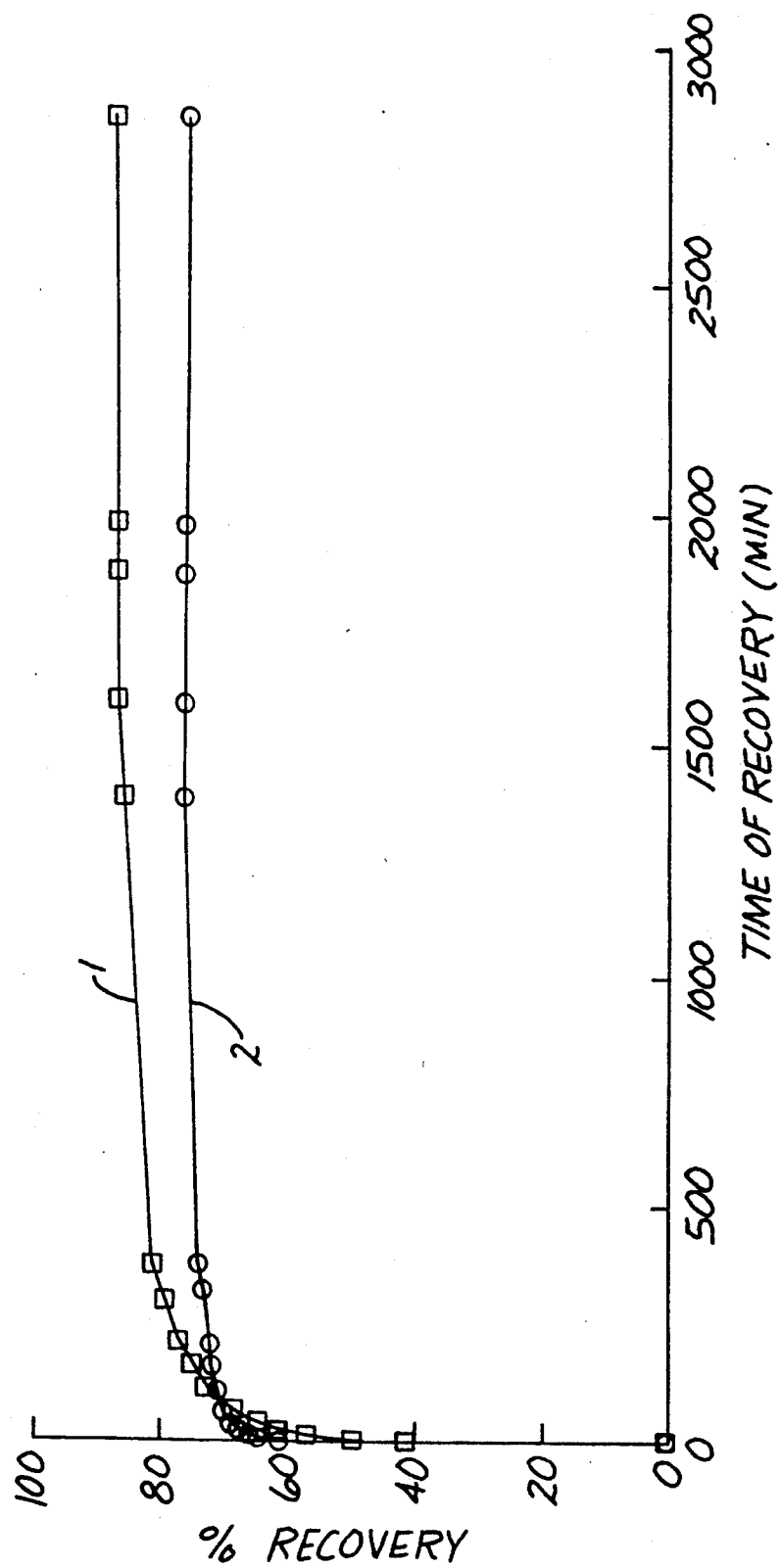
FIG. 1 is a graph comparing the elastic recovery over time of an inventive film with a PVC film.

The films as provided comprise
a) about 60-98% by weight ionomeric polymer resin having a melt flow index greater than about 10, and
b) about 2-40% by weight of a filler material that is not an ionomeric polymer, wherein the film has a thickness of between 0.050 and 0.127 mm.

These films provide significant property advantages in thermal and dimensional stability and may also exhibit superior aging and decreased embrittlement characteristics as compared to the standard PVC films used widely today. These advantageous properties are available even though the ionomeric resin-based films need not contain volatile, migrating or leachable additives or plasticizers. Films as described herein are comparatively benign from an environmental standpoint, because they produce no chlorinated byproducts from combustion. This is an additional advantage in residential and other interior uses, where it is desirable to reduce the amount of harmful chemicals released in the event of a fire.

Ionomeric resin-based films as described herein also are more simple to make than PVC films, because the number and degree of premixing of ingredients is drastically reduced in making the conformable film. Because there are thermally reversable crosslinks in the ionomeric polymer, these films may be more readily recycled than PVC films.

The ionomeric polymers used in the present invention are copolymers of ethylene with acrylic acid or methacrylic acid, neutralized with a metal cation such as zinc, sodium, or magnesium. The particularly preferred ionomeric polymers are copolymers of ethylene with methacrylic acid. The ionomeric polymers effective for use in this invention have a melt flow index of at least about 10. Preferably, the ionomeric polymer has a melt flow index of at least about 12. Melt flow index is determined by following the recognized and well-known protocol set forth in ASTM D 1238. E. I. DuPont de Nemours Co. produces a line of neutralized ethylene-co-methacrylic acid ionomeric polymers under the name Surlyn TM that are acceptable for the present use, provided that the selected resin has the requisite melt flow index. A particularly preferred resin is Surlyn TM 1702 resin, which has a high melt flow index (14.0), a low flexural modulus (152 N/mm$^2$), and good low temperature flexibility.

A small amount of filler material is necessary to endow ionomer-based films with the required conformable and inelastic properties required in a film product. The typical range of filler material content is from about 5–40% by weight. Preferably the filler material content is about 5–25% by weight, and more preferably about 5–15%.

The filler material may be selected from any material that is distinct in nature from the ionomeric polymer, thus providing the desired flexoral and conformance properties. In its most general sense, the filler may be any material appropriate for mixing in a polymeric resin to be made into a film that is not an ionomeric polymer. More specifically, the filler may be selected from non-reinforcing fillers such as mineral fillers, glass bubbles and the like, or may be selected from polymeric resins. The filler material is preferably selected from pigments, such as $TiO_2$. Often such pigments are provided in a polymeric resin carrier, which is appropriately included as a part of the filler material mass for measurement purposes. Divergent polymeric materials may also be used as the filler material itself, such as ethylene polymers, polypropylene polymers (PP), polyoxyethylene copolymers (PEO), ethylene-co-acrylic acid (EAA), ethylene-co-methacrylic acid (EMAA), ethylene-co-vinyl acetate (EVA), polypropylene containing 12–18% of ethylene propylene rubber, and the like. Other examples of filler materials are synthetic wax oil. Particularly preferred waxes include the ACLYN TM line of low molecular weight ionomeric waxes from Allied Signal, Inc. The ancillary properties of the ultimate film that is formed will be dependant on the nature of the filler material component that is added to the ionomeric resin. For example, when the filler material is a resin that typically forms an elastomeric material, the resulting film of the present invention will tend to be more rubbery in nature and even more tear resistant than the ionomeric film without additive. Films made with a less elastomeric filler, such as polypropylene, tend to be stiffer.

Because the filler materials are selected from different types of substances, it is envisioned that differing compatibilities and propensities of the filler to dominate the physical properties of the ultimate film will be observed. Ideal ranges of filler content may be different from one filler to another.

The film is typically provided at thicknesses of between about 0.050 and 0.127 mm thick. Films thinner than about 0.050 mm are difficult to handle and do not have significant tear strength advantage over less expensive alternatives. Films thicker than about 0.127 mm are not very conformable, and therefore do not provide this advantageous property. Preferably, films are provided in thicknesses of between about 0.064 to 0.104 mm, and more preferably between about 0.076 to 0.089 mm.

Films according to the present invention are made by merely dry mixing pellets of ionomeric resin and pellets of pigment, or other selected filler material. The thus dry-blended materials are melted and mixed in a single screw extruder, then die cast to form the final film. The film may optionally be laminated to a carrier web, such as a glossy or matte-finish polyester carrier film, for ease of handling and coating. The caliper control of the extrusion cast film is typically much better than for a calendered material.

The ionomeric resin-based films described herein are useful in applications typically satisfied by highly plasticized PVC-based materials. Particularly advantagous applications for the present films are as adhesive composites, where later shrinking of the film can result in adhesive failure when the composite backing (meaning the film) no longer corresponds to the dimension of the substrate to which the composite is adhered. Such adhesive composites include those containing pressure-sensitive adhesive generally considered to be permanent and composites intended to be repositionable in nature. Other adhesive composites include those containing a hot melt adhesive, which would be considered to be a permanent application of the film.

Examples of adhesive composites intended to be permanently fixed include tapes, such as electrical tapes, the so-called "vinyl tapes," and the repair tapes such as PVC pipe repair tape. A separate class of tapes that may be constructed using ionomeric resin-based backings are the pavement marking tapes. Ionomeric resin-based conformable films are envisioned to be useful in such applications both as a topcoat and a substrate layer. Yet another class of tapes that may benefit from an ionomeric resin-based backing is the automotive striping and decal applications.

Examples of adhesive composites intended to be repositionably fixed primarily include graphics-related materials. These materials include large decorative posters for application to a wall. Also contemplated are graphics displays for commercial vehicles that are initially repositionable during application to the vehicle and then become permanently affixed, or such graphics that continue to be removable during the display life of the product.

In embodiments where the adhesive applied to the film is repositionable, the adhesive may be selected from any adhesive that may be repeatably adhered to and removed from a substrate without substantial loss of adhesion capability. An example of such an adhesive is disclosed in U.S. Pat. No. 3,691,140 to Silver, which relates to solid tacky microspheres. Repositionable adhesives are also known in which microspheres contained in the adhesive are non-tacky. A disclosure of this type of adhesive is provided in U.S. Pat. No. 4,735,837 to Miyasaka. Repositionability may also be achieved by other techniques, such as pattern coating of the adhesive.

Preferably, the repositionable adhesive provided on the film comprises between about 60–100% by weight of hollow, polymeric, acrylate, inherently tacky, infusible, solvent-insoluble, solvent-dispersible, elastomeric pressure-sensitive adhesive microspheres having a diameter of at least 1 micrometer, and between about 0–40% by weight of a non-spherical polyacrylate adhesive. These hollow microspheres are made in accordance with the teaching of European Patent Application 371,635. The non-spherical polyacrylate adhesive may be any conventional pressure-sensitive adhesive. Examples of such adhesives are polymers made from the "soft" monomers such as n-butyl acrylate, isooctyl acrylate, or the like, or copolymers made from a soft component, such as isobutylene, n-butyl acrylate, isooctyl acrylate, ethyl hexyl acrylate, or the like; and a polar monomer such as acrylic acid, acrylonitrile, acrylamide, methacrylic acid, methyl methacrylate or the like. Non-spherical polyacrylate adhesives are commercially available, for example, as the Rohm and Haas Rhoplex TM line of adhesives. Preferably, the non-spherical polyacrylate adhesive is present in the repositionable adhesive at an amount of about 10–35% by weight.

While other repositionable adhesives are generally effective to support films as presently described, the repositionable adhesive comprising hollow microspheres are particularly effective for holding large samples of film to vertical surfaces. This increased holding power is particularly required where the film to be supported has a surface area exceeding about 0.3 square meters. When the repositionable adhesive additionally comprises a non-spherical polyacrylate adhesive, improved anchorage of the total adhesive to the film is observed, resulting in less adhesive residue being left on the substrate after removal. Also, repositionable adhesives comprising non-spherical polyacrylate adhesives exhibit excellent shear adhesion properties, even for highly textured vertical surfaces. These advantageous adhesive properties are obtained without excessive adhesion to substrates such as painted walls that would result in peeling of the paint off of the wall when the film adhesive composite is removed. Improved anchorage, shear and adhesion properties are also observed for this adhesive when used with other film backings, such as polyvinyl chloride backings.

The films of the present invention provide particular advantage in excellent tear strength and conformability. Tear strength is evaluated using standard test methods to determine the Elmendorf tear strength. Thus, while samples of polyvinyl chloride films typically used on the market may exhibit an Elmendorf tear strength in the range of 50 to 200 grams/ply, ionomeric-based films have an Elmendorf tear strength in excess of 280 grams/ply, and preferably greater than 300 grams/ply. The Elmendorf tear strength measurements noted above are taken on 0.076 mm films in the machine direction.

Conformance as discussed herein has two basic elements. First, the film must be capable of initially modifying its shape so that it will accommodate irregular surfaces over which it is stretched. The ability of a film to initially conform over an irregular surface can be measured by evaluating the hysteresis of the film. Hysteresis is a measurement of the energy lost or dissipated when a film sample is stretched and immediately released in a cyclic deformation. The greater the amount of energy lost (hysteresis), the more conformable the film. While PVC films exhibit excellent hysteresis properties, they suffer other drawbacks as will be illustrated below. Unfilled ionomeric polymer-based films have unacceptably low hysteresis values. Because they do not provide good initial conformance to irregular surfaces, unfilled ionomeric-polymer films do not satisfy requirements of the desired conformable films.

The second important element to conformance as desired herein is the Long-Term Elastic Recovery of the film.

Long-Term Elastic Recovery is determined by providing a sample of the resin in a 50.8 mm × 12.7 mm by 0.102 mm film sample. The sample is placed in a tensile tester and stretched 100% in length at a rate of 508 mm/minute. The sample is allowed to remain in the jaws of the tensile tester for 5 minutes or for 10 minutes to equilibrate, then removed and placed in a temperature and humidity controlled chamber at 25° C. and 50% relative humidity. The Long-Term Elastic Recovery is calculated by the following equation:

$$100 - \left[\left(\frac{Y-X}{Z-X}\right) \times 100\right] = \% \text{ recovery}$$

where
 X = unstrained length
 Z = initial strained length
and
 Y = length of sample at some later time "t."

Long-Term Elastic Recovery is evaluated by taking periodic measurements over a 40 hour time period after imposing an initial known strain. Preferably, the film will exhibit a Long Term Elastic Recovery of no more than 80% after 40 hours when the film is 0.1 mm thick and initially held for 5 minutes. Similarly, the film should exhibit no more than 20% recovery after 40 hours when initially held for 10 minutes.

Ionomeric polymer-based films were surprisingly found to recover almost instantaneously from an imposed deformation to a limiting degree, followed over a long time span with almost no additional recovery. This behavior is beneficial for a wall decorating substrate film, where one desires the film to be mechanically stable and resist shrinkage which may lead to failure, as in the case of plasticized PVC sheets.

Mechanically, plasticized PVC has excellent initial conformance to irregular surfaces, springing back only slightly less than or equal to 40% for PVC Comparative Example A below, over the initial few minutes of application. However, over longer time spans (1 hour-several days) or at elevated temperatures, PVC suffers considerable creep and elastic recovery which lead to failure by pop-off or lift. Conversely, ionomer-based films according to the present invention, although rebounding initially to a greater extent (about 50–60%) than PVC, exhibits greatly reduced long-term dimensional changes in comparison. Thus, ionomer-based films according to the present invention, once properly applied, show better stability and conformance than PVC films.

The following examples are presented for illustrational purposes only, and are not intended to limit the scope of the invention.

EXAMPLE 1

86 parts of dry pellets of Surlyn TM 1702 resin from DuPont were mixed with 14 parts of Ampacet TM 11748 pigment, a TiO$_2$ white pigment concentrate in linear low density polyethylene commercially available from Ampecet Corporation. The thus dry-blended materials were melted and mixed in a single screw extruder, then cast to form a 0.076 mm. film on a matte-finish polyester carrier web.

EXAMPLES 2–7

A resin blend is prepared as described in Example 1, and is die cast onto a matte-finish carrier web in varying thicknesses as follows:

| | |
|---|---|
| Example 2 | 0.050 mm |

-continued

| | |
|---|---|
| Example 3 | 0.064 mm |
| Example 4 | 0.081 mm |
| Example 5 | 0.089 mm |
| Example 6 | 0.102 mm |
| Example 7 | 0.127 mm |

EXAMPLE 8-20

Resin blends were prepared as described in Example 1, and were cast onto a matte-finish carrier web at a film thickness of 0.076 mm, according to the following material ratios:

| Example | Surlyn ™ 1702 | PP[1] | AMPACET 11748[2] |
|---|---|---|---|
| 8 | 69 | 17 | 14 |
| 9 | 52 | 34 | 14 |
| 10 | 34 | 52 | 14 |
| 11 | 86 | — | 14 |
| Example | Surlyn ™ 1706 | | AMPACET 11748 |
| 12 | 86 | | 14 |
| Example | Surlyn ™ 9020 | PP | AMPACET 11748 |
| 13 | 69 | 17 | 14 |
| 14 | 86 | — | 14 |
| Example | Surlyn ™ 1702 | ULDPE[3] | AMPACET 11748 |
| 15 | 67.5 | 22.5 | 10 |
| Example | Surlyn ™ 1702 | LDPE[4] | AMPACET 11748 |
| 16 | 45 | 45 | 10 |
| 17 | 67.5 | 22.5 | 10 |
| Example | Surlyn ™ 1702 | EAA[5] | AMPACET 11748 |
| 18 | 52 | 34 | 14 |
| Example | Surlyn ™ 1702 | EMAA[6] | AMPACET 11748 |
| 19 | 52 | 34 | 14 |
| Example | Surlyn ™ 1702 | EVA[7] | AMPACET 11748 |
| 20 | 52 | 34 | 14 |

[1] PP is polypropylene.
[2] AMPACET 11748 is a mixture of 70% TiO₂/30% Linear Low Density Polyethylene.
[3] ULDPE is ultra low density polyethylene.
[4] LDPE is low density polyethylene.
[5] EAA is ethylene acetic acid.
[6] EMAA is ethylene methacrylic acid.
[7] EVA is ethylene vinyl acetate.

COMPARATIVE EXAMPLE A

Manufacture of flexible, plasticized PVC film.

A flexible plasticized polyvinyl chloride film corresponding to the PVC backing used in 3M Cat. No. 231 adhesive tape was provided at a thickness of 0.076 mm. This PVC film was selected as representative of PVC films used for this type of application.

COMPARATIVE EXAMPLE B

An unfilled Surlyn ™ 1702 resin was extruded without previously mixing with any component to a caliper of 0.102 mm.

STABILITY OF ELASTIC RECOVERY FROM DEFORMATION

Table I shows the elastic recovery of films over time for the films of Example 1 and Comparative Example A where the sample is held at 100% elongation for 5 minutes. These elastic recovery measurements are graphically presented in FIG. 1. Comparative Example A Elastic Recovery 1 is the elastic recovery curve of the PVC film prepared according to Comparative Example A over time. Example 1 Elastic Recovery 2 is the elastic recovery curve of the filled Surlyn ™ resin prepared according to Example 1 over time.

FIG. 2 shows a closer view of the graph of FIG. 1, so that the initial portion of the recovery curve is more clearly shown. While initially the film of Example 1 recovers faster, after about 90 minutes the film of Comparative Example A begins to recover more from the initial stretching.

From initial identical deformations (100%), Comparative Example A attains an equilibrium recovery of 87.5%, while Example 1 attains an equilibrium recovery of 75.9%. Although Comparative Example A initially does not recover as much (41.7% vs. 61.1%) as Example 1, Comparative Example A recovers at a faster rate (about 0.1%/min vs. 0.03%/min) and to a greater final extent. This greater recovery causes failure of adhesive composite products by creating stress in the adhesive layer, causing the adhesive to fail.

TABLE I

Elastic Recovery of Films

| Time (min) | % R Comparative Example A | % R Example 1 |
|---|---|---|
| 2 | 41.7 | 61.1 |
| 8 | 50.0 | 64.8 |
| 17 | 57.3 | 66.7 |
| 26 | 61.5 | 68.5 |
| 41 | 64.6 | 69.4 |
| 69 | 68.8 | 70.4 |
| 118 | 72.9 | 71.3 |
| 169 | 75.0 | 72.2 |
| 216 | 77.1 | 72.2 |
| 313 | 79.2 | 73.2 |
| 386 | 81.3 | 74.1 |
| 1400 | 85.4 | 75.9 |
| 1600 | 86.5 | 75.9 |
| 1878 | 86.5 | 75.9 |
| 1986 | 86.6 | 75.9 |
| 2850 | 87.5 | 75.9 |

In applications where an adhesive composite is adhered to a surface, it is believed that Long-Term Elastic Recovery is more closely predicted by initially holding the sample in the extended state for a longer term. This is because in actual use in adhesive composites, the film is held in its extended state on the substrate by the adhesive.

After initial extension of the 50.8 mm×12.7 mm×0.105 mm sample film 100% in length at a rate of 508 mm/minute, the samples are held in the strained state for 10 minutes and then allowed to recover to equilibrium. The films of Example 1 and Comparative Example B were found to reach equilibrium by about 90 hours. The film of Comparative Example A at that time was still recovering slightly. Comparative Example B had the least amount of recovery under this test, about 6.67%, but is not very conformable as shown below. The film of Example 1 recovered only about 10.81%. The film of Comparative Example A recovered about 64.47%.

In the hysteresis test, a film sample 50.8 mm×12.7 mm×0.102 mm is clamped in a tensile testing machine. The sample is strained to a known final elongation (either 5% or 25%, which corresponds to 53.3 mm and 63.5 mm, respectively) at a rate of 305 mm/min. and immediately returned to zero elongation. The stress/strain curves in the sense of increasing and decreasing elongation then describe a hysteresis loop, and the area between these ascending and descending stress/strain curves is equal to the energy loss per deformation cycle, or the hysteresis.

In Table II, the hysteresis properties of Surlyn ™ 1702 films of varying thicknesses are compared to plasticized PVC. The PVC has greater hysteresis (the energy loss per cycle, or the amount of deformation that is non-recoverable), but the filled Surlyn ™ 1702 film is again somewhat similar.

TABLE II

Hysteresis of Films
Effect of Composition and Film Thickness

| Example | 5% Hysteresis (MJ/m$^3$) | 25% Hysteresis (MJ/m$^3$) |
|---|---|---|
| 3 | 0.036 ± 0.008 | 1.016 ± 0.134 |
| 4 | 0.039 ± 0.005 | 0.905 ± 0.052 |
| 5 | 0.029 ± 0.005 | 0.893 ± 0.066 |
| 6 | 0.048 ± 0.004 | 0.910 ± 0.126 |
| Comparative B | 0.003 | 0.635 |
| Comparative A | 0.142 ± 0.019 | 1.768 ± 0.174 |

Comparative Example B exhibits low hysteresis, attributed to a lack of filler in this sample. Unfilled ionomeric films thus are not very conformable.

In Table III, the mechanical properties of several films are compared. From the Table, films of the present invention are roughly twice as flexible as the PVC film of Comparative Example A, based on the modulus values. The tensile strength at yield is equivalent for both films, while the resistance to tear is significantly greater for the inventive films. Tear resistance relates to the ability of the film to be die-cut without further tearing at sharp corners.

Shrinkage of films is determined by following ASTM D 702-81 test, except that the temperature used was 66° C. The PVC film of Comparative Example A has about 2.5% machine direction shrinkage, compared with generally less than 1% machine direction shrinkage for the inventive films. This again demonstrates the greater mechanical stability of the ionomeric resin materials.

TABLE III

Mechanical Properties of Films

| Sample | Tensile Modulus | MD Tensile lbs. | CD Tensile lbs. | MD Tear gms. | CD Tear gms. | MD Shrink % | CD Shrink % |
|---|---|---|---|---|---|---|---|
| Example 8 | 26072 | 9.9 | 9.9 | 99.3 | 1600 | 0.505 | 0.082 |
| Example 9 | — | 12.1 | 10.7 | 21 | — | — | — |
| Example 11 | 20000 | 8.1 | 8.2 | 560 | 864 | 0.38 | 1 |
| Example 12 | 30872 | 13.6 | 13.1 | 51 | 67 | 1.18 | 0.1 |
| Example 15 | 28314 | 10.9 | 10.3 | 51.4 | 72 | — | — |
| Example 13 | 17293 | 7.9 | 6.6 | 88.4 | 720 | 1.91 | 0.045 |
| Example 14 | 9353 | 5.8 | 5.6 | 47 | 51 | 0.241 | 1.2 |
| Comparative Example A | 49000 | 8.8 | 8.6 | 180 | 255 | 2.5 | 1 |

Application of Ionomeric Resin Films as Wall Decoration

The films of Example 1 and Comparative Example A were coated (335 mg/200 cm$^2$) with an adhesive comprising 75% (by weight) hollow microsphere adhesive (HMSA) in a binder of 25% Rohm & Haas N-1031 acrylic pressure sensitive latex adhesive. Sample strips approximately 2.4 meters long by 152-203 mm wide were cut from the films and adhered to a variety of textured wallboard surfaces painted with either Glidden Flat acrylic latex paint or Sears Semi-Gloss acrylic latex paint (both white paints). The sample strips were applied with hand pressure using a soft cloth or towel. The samples were tested in both hot (41° C.) and cold 10° C.) test chambers, as well as in a continuous testing facility kept at 29° C. Both films adhered well to smooth-textured flat and semi-gloss painted surfaces. However, Comparative Example A failed repeatedly when applied to a semi-gloss painted surface bearing any texture. Conversely, Example 1 performs very well on semi-gloss-painted textured surfaces. Also, the inventive material has better conformance on flat-painted surfaces.

We claim:

1. A flexible and conformable film comprising:
   a) about 60-98% by weight ionomer resin that is a copolymer of ethylene and acrylic acid or methacrylic acid neutralized by a metal cation, said resin having a melt flow index greater than about 10 and
   b) about 2-40% by weight of a filler material, wherein said film has a thickness of between 0.050 and 0.127 mm wherein said film is substantially free of migrating plasticizers or leachable additives and wherein said film has an Elmendorf tear strength in excess of 280 grams/ply.

2. The film of claim 1, wherein said ionomeric resin is a copolymer of ethylene and methacrylic acid.

3. The film of claim 1, wherein said metal cation is selected from the group consisting of zinc, magnesium and sodium.

4. The film of claim 1, wherein said metal cation is zinc.

5. The film of claim 1, wherein said ionomer resin is a copolymer of ethylene with methacrylic acid that has been neutralized with zinc.

6. The film of claim 1, wherein said ionomer resin has a melt flow index of at least about 12.

7. The film of claim 1, wherein said film comprises between about 5 and 25% by weight of filler material.

8. The film of claim 1, wherein said film comprises between about 5 and 15% by weight of filler material.

9. The film of claim 1, wherein said filler material comprises a pigment.

10. A film of claim 1, wherein said filler material comprises a polymer selected from the group consisting of low density polyethylene polymers, high density polyethylene polymers, polypropylene polymers, polyoxyethylene copolymers and polypropylene/ethylene copolymers.

11. The film of claim 1, wherein said filler material comprises a synthetic wax.

12. The film of claim 1 wherein said film is about 0.064 to 0.102 mm thick.

13. The film of claim 1 wherein said film is about 0.076 to 0.089 mm thick.

14. The film of claim 1, further comprising a layer of adhesive on one side of said film.

15. The film of claim 14, wherein said adhesive is a pressure-sensitive adhesive for permanantly adhering said film to a substrate.

16. The film of claim 14, wherein said adhesive is a pressure-sensitive adhesive for repositionably adhering said film to a substrate.

17. The film of claim 16, wherein said adhesive comprises
a) between about 60–100% by weight of hollow, polymeric, acrylate, inherently tacky, infusible, solvent-insoluble, solvent-dispersible, elastomeric pressure-sensitive adhesive microspheres having a diameter of at least 1 micrometer, and
b) between about 0–40% by weight of a non-spherical polyacrylate adhesive.

18. The film of claim 17, wherein said non-spherical polyacrylate adhesive is a copolymer of butyl acrylate and acrylonitrile.

19. The film of claim 17, wherein said non-spherical polyacrylate adhesive is present in the repositionable adhesive at an amount of about 10–35% by weight.

20. The film of claim 1, wherein said film exhibits a Long-Term Elastic Recovery of no more than 20% after 40 hours when 0.1 mm thick and initially held for 10 minutes.

21. The film of claim 1, wherein said film has a hysteresis value of more than 0.01 $(MJ/m^3)$ under the 5% hysteresis test.

22. The film of claim 1, wherein said film has a machine direction Elmendorf tear strength of greater than 300 g/ply when 0.076 mm thick.

* * * * *

UNITED STATES PATENT AND TRADEMARK OFFICE
CERTIFICATE OF CORRECTION

PATENT NO. : 5,198,301
DATED      : March 30, 1993
INVENTOR(S) : Patrick J. Hager, Del A. Kauss, and Janet T. Keller It is certified that error appears in the above-indentified patent and that said Letters Patent is hereby corrected as shown below:

Col. 3, line 38, "synthetic wax oil" should read -- synthetic waxes or mineral oil --

Signed and Sealed this

First Day of November, 1994

Attest:

BRUCE LEHMAN

Attesting Officer    Commissioner of Patents and Trademarks